(No Model.) 3 Sheets—Sheet 2.
S. H. SHORT.
PROPELLING MECHANISM FOR ELECTRIC MOTOR CARS.
No. 449,709. Patented Apr. 7, 1891.
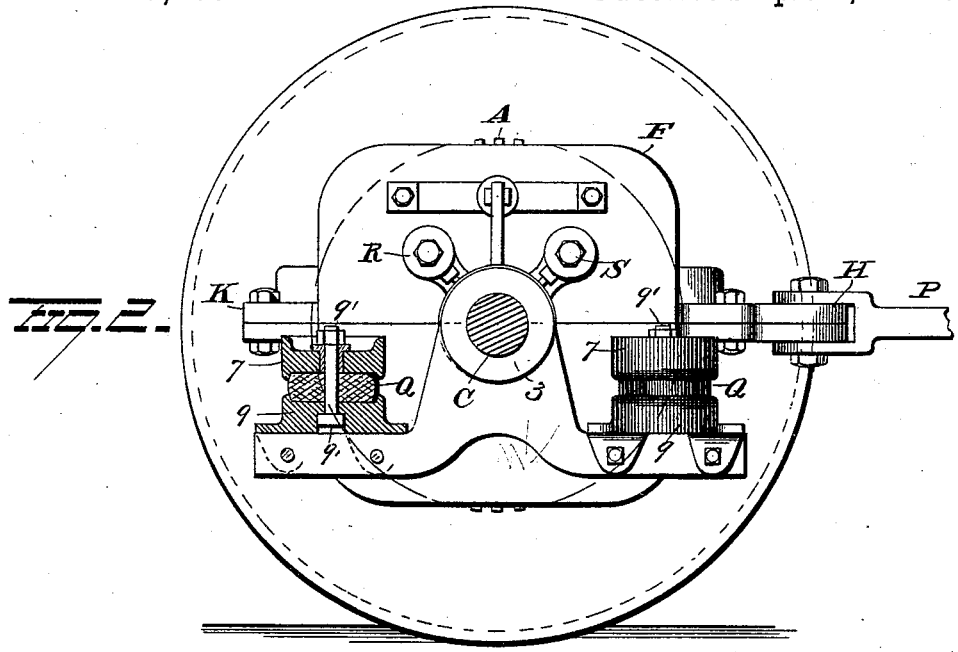
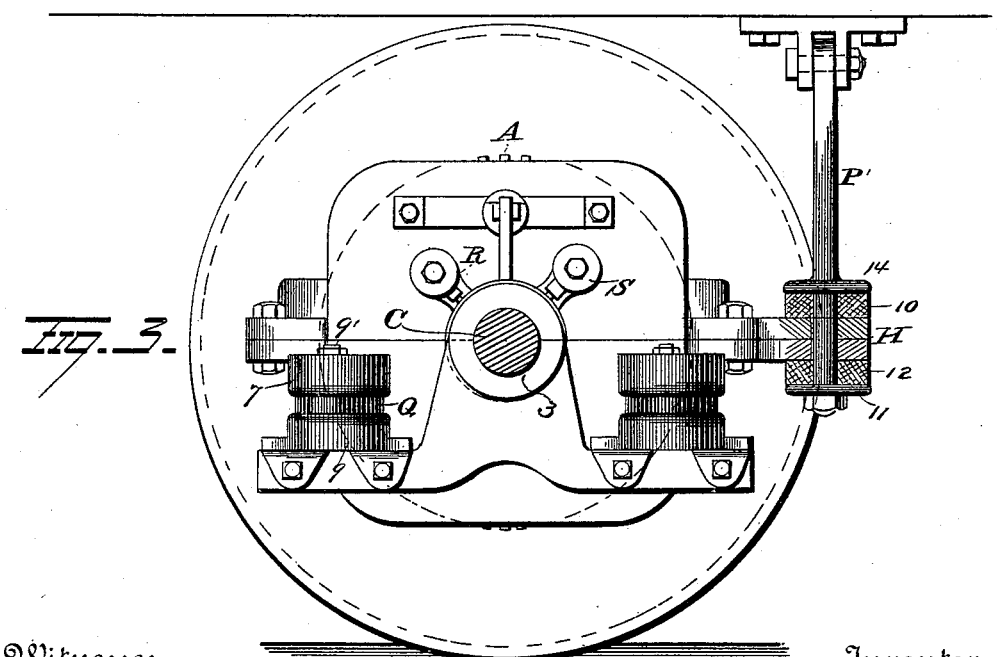
Witnesses
E. I. Nottingham
G. F. Downing
Inventor
Sidney H. Short
By H. A. Seymour
Attorney (No Model.) 3 Sheets—Sheet 3.
S. H. SHORT.
PROPELLING MECHANISM FOR ELECTRIC MOTOR CARS.
No. 449,709. Patented Apr. 7, 1891.
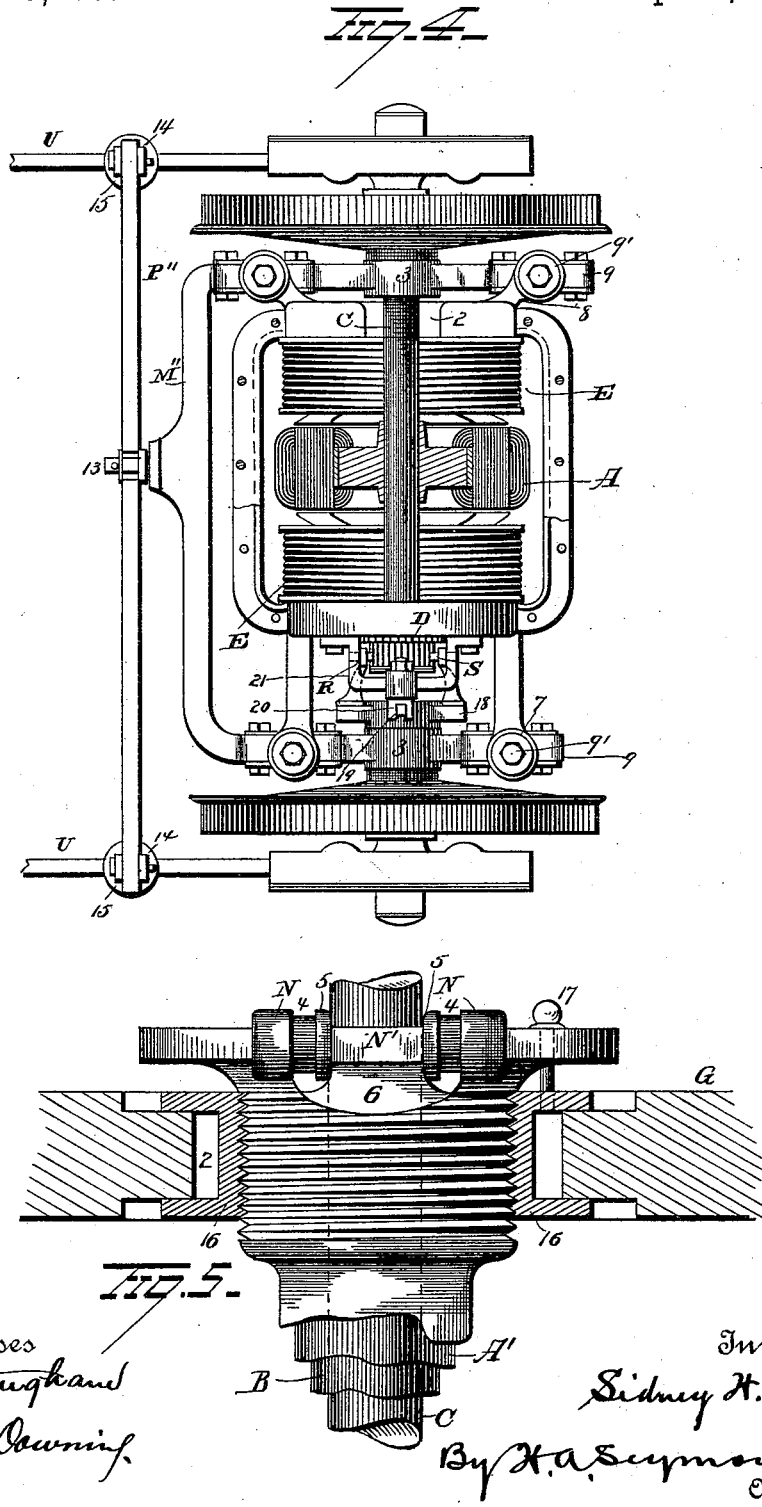

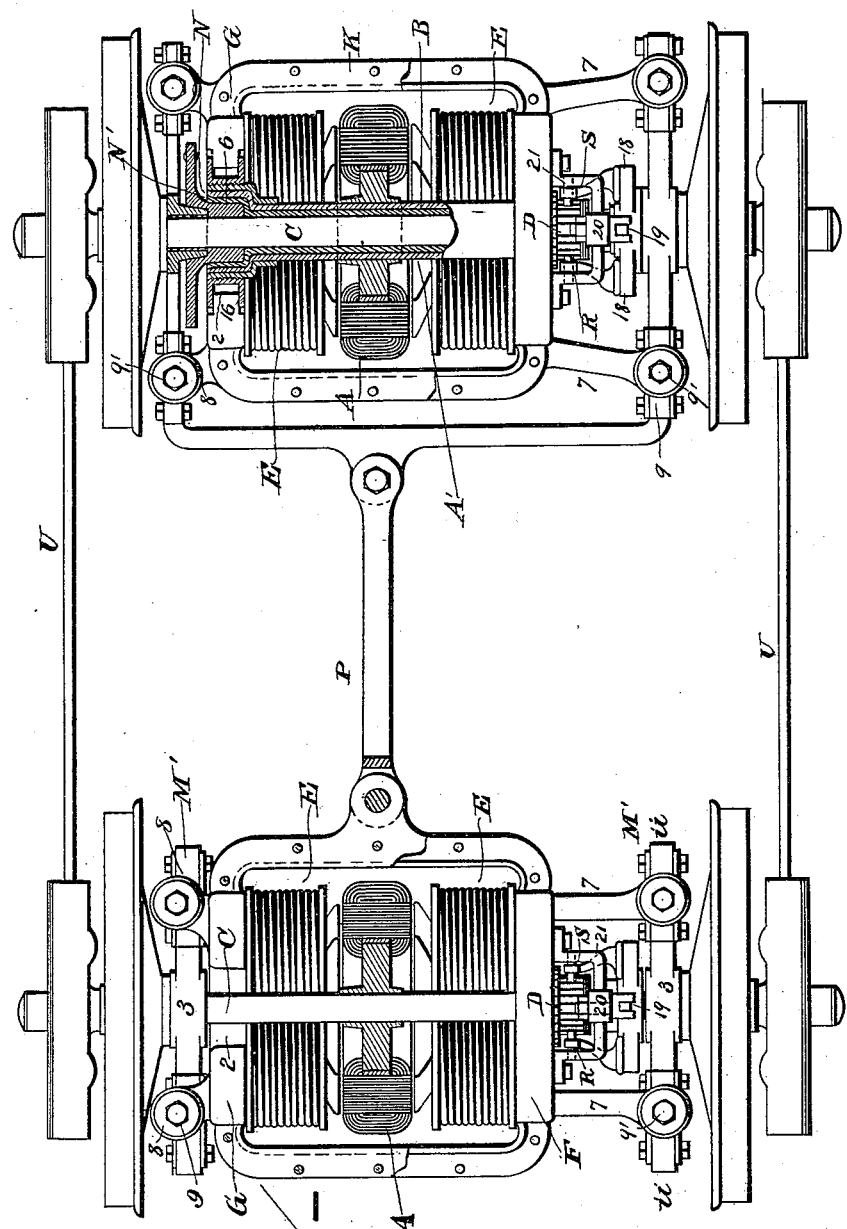

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

PROPELLING MECHANISM FOR ELECTRIC-MOTOR CARS.

SPECIFICATION forming part of Letters Patent No. 449,709, dated April 7, 1891.

Application filed December 11, 1890. Serial No. 374,308. (No model.)

*To all whom it may concern:*

Be it known that I, SIDNEY H. SHORT, of Cleveland, in the county of Cuyahoga and State of Ohio, have invented certain new and useful Improvements in Propelling Mechanism for Electric-Motor Cars; and I do hereby declare the following to be a full, clear, and exact description of the invention, such as will enable others skilled in the art to which it appertains to make and use the same.

This invention relates more particularly to the propelling mechanism of electric-motor cars, in which a propelling motor has its armature axially placed with reference to a driving-axle and directly connected with said axle. By "axially placed" is to be understood that the axes of the armature and driving-axle are coincident, or nearly so, the most ready means of securing an axial position being the mounting of the armature on the car-axle. By "directly connected" is to be understood that the armature and car-axle revolve together at the same or substantially the same speed of rotation.

In accordance with the present invention the axially-placed and directly-connected armature is combined with field-magnets mounted on short hanger-frames, which are pendulously suspended from the car-axle, preferably between the wheels, so as to bring the journals close to the motor, and are held from rotation by a direct or indirect connection with another part of the car, as with another car-axle or the car-body or a frame under the car-body, adapted to prevent the said short frame from turning on the car-axle.

Further, in the present invention a spring mounting or support through springs or buffers is provided for the field-magnets on the aforesaid short frame.

The invention also relates to the insulation of a motor mounted as above indicated, and to means whereby movements of the field-magnets lengthwise of the armature-axis are prevented, while transverse movements are permitted, and to means whereby the field-magnets may be adjusted.

The invention extends to the mounting, as indicated above, of motors in general with or without the interposition of springs or buffers, and also with or without insulating the motor from the ground, irrespective of the precise form of the motors. Special features, however, are included also with respect to this—that is to say: first, the field-magnets are arranged symmetrically with reference to the car-axle, so that they balance themselves thereon; second, the field-magnets are arranged horizontally; third, the field-magnets are placed above (or not materially below) the lowest part of the armature; fourth, the field-magnets are placed at the sides of the armature parallel with the said axle; fifth, multipolar field-magnets are employed, the armature being adapted to use with such a field, as by means of cross connections at the commutator; sixth, the field-magnets of the multipolar field are so arranged that the magnets of the two lowermost poles are equidistant from the lowest part of the armature, one pole in front and one in rear of the same. Although it is designed to use all these features in connection with one another, yet it is obvious that one or more of them can be used without the other, and the invention extends to such use.

In the accompanying drawings, which form part of this specification, Figure I is a partial view in plan, partly in horizontal section, of a car-truck provided with propelling mechanism in accordance with the present invention. Fig. II is a section on line $i\,i$ of Fig. I. Fig. III is a similar view illustrating a connection of the short frame with the car-body. Fig. IV is a plan view, partly in horizontal section, illustrating a connection of the short frame with the side bars of a car-truck; and Fig. V is a detail view illustrating on a larger scale the driving connection of the right-hand motor of Fig. I.

In Fig. I somewhat different mountings are shown for the two motors. This is done for the purpose of saving illustration, as practically the motors on both axles will be as nearly identical as possible, although, of course, they might be different, as shown. In all the motors shown, the armature A is composed of a soft-iron strip wound upon itself and provided with bobbins of insulated wire wound about the ring so made in notches in the edges thereof. The bobbins are connected in closed series, and from the junction-wires are led to the strips of a commutator D. The armature A is not only axially placed with reference to the car-axle C, but is mounted thereon, so as to turn therewith without requiring any journal-bearings. In the motor at the right of Fig. I the armature is fast on a hollow shaft A', which surrounds the car-axle C, an insulating sleeve B of, say, soft vulcanized rubber being interposed. By the use of soft rubber for the sleeve the armature is not only insulated from the car-axle, but has a spring-mounting thereon. The armatures in the other motors are mounted on the car-axle without insulation. The armatures in all the motors are connected directly with the car-axle. In the motor at the right of Fig. I direct driving connection is made by forks N on the shaft A', engaging arms N', projecting from a collar 6, which is fast on the hub of a car-axle C. Spring-pads 4 of, say, soft vulcanized rubber are interposed between the forks N and the arms N', the ends of the pads being protected by metal caps 5. In the other motors the driving connection is through the mechanical means by which the armature is made fast on the car-axle.

The field-magnets E in all the motors shown are arranged symmetrically about the car-axle in a horizontal position above (or not materially below) the lowest point of the armature, and at the sides of the armature parallel with the car-axle. These are, as represented, eight in number to form a multipolar field of four poles, each pole being constituted by two magnets in line with each other on opposite sides of the armature. These field-magnets are so arranged that the four lowermost magnets are equidistant from the lowest point of the armature, the magnets of one polarity being in front and those of the other sign in rear of said lowest point. The magnets E project from yokes F G, which are provided with openings 2 for the passage of the car-axle C or the armature-shaft A'. The yokes F G are connected together by arms H K. To facilitate the application to the car-axle, the yokes F G and the arms H K are divided horizontally.

The field-magnets of each motor shown are mounted on the short hanger-frame M' or M''. The frame M' (see left hand of Fig. I and Figs. II and III) is in two parts, each of a general inverted-T shape, with the journal-bearings 3, by which it is pendulously hung on the car-axle C in the stem of the T. The arms underlie projections 7 and 8 on the yokes F G, respectively. In order to give a spring mounting to the field-magnets, springs or buffers Q are interposed between the projections 7 and 8 and heads 9, which have forks on the bottom which span the underlying arms of the frame M' and are bolted thereto. These springs or buffers are preferably made of soft vulcanized rubber, so that they serve also as insulating material; but of course a spring action with insulation could be secured without having the same material serve both purposes. The bolts 9', which secure the projections 7 and 8, have insulating-sleeves where they pass through the said projections, so as to complete the insulation. The frames M'' differ from the frame M' only in having the two parts of the latter connected with each other. The short frames M' M'' and their field-magnets are held from rotation by a connection with a suitable part of the car. In Fig. I the connection is made with the other axle indirectly through the short frame or the magnets and the short frame on said axle by means of a bar P, jointed at one end of the arm H of the field-magnets on one axle and at the opposite end to the frame M'' on the other axle.

In Fig. II the connection is with the car-body through a rod P', jointed at its upper ends, and its lower end passing through the arm H of the motor-magnets, springs or buffers 10 of, say, soft vulcanized rubber being interposed between the flange 11 on the rod P' and its nut 12 and said arm. An insulating sleeve may surround the rod P' where it passes through the arm H.

In Fig. IV the frame M'' has a pivot-pin 13, which works in a horizontal slot in the cross-bar P'', the end of the said cross-bar being upheld by the side bars U of the truck-frame. These side bars may be of any known or suitable description. As shown, the cross-bar P'' is pivoted between ears 14 on heads 15, which are fastened to the side bars. Other like arrangements may be adopted to hold the frame and magnets from rotating on the car-axle.

To prevent or restrict the movements of the field-magnets lengthwise of the armature-axis while permitting transverse movements, the grooved collar 16 receives a part of the yoke G in the groove, leaving clear spaces for permitting the motion of the yoke toward and away from the axis of the collar. To adjust the field-magnets relatively to the armature, the collar 16 is shown as screwed on the hub of the casting which carries the forks N. One or more pins 17, Fig. V, may be inserted through the collar and casting to retain the collar in the position to which it may be adjusted.

The commutator D is fast on the car-axle C or the armature-shaft A', and rotates in contact with brushes R and S, which are placed ninety degrees apart for the four-pole machine shown. These brushes are carried by a collar 18, loose on the car-axle C or armature-shaft A', and held from rotating by an arm 19, which engages the slotted end of a wrist-pin 20, which is pivoted in a bracket 21 on the yoke F. The current is supplied to and cut off from the motor in any known or suitable way.

In the foregoing description the armature has been described as rotating with the car-axle and the field-magnets as non-rotative.

It is evident that this might be reversed, the field-magnets being allowed to rotate and being connected directly with the car-axle to turn the same and the armature being held from rotation. It will be understood that this reversed arrangement is included in the invention as a substitute for that particularly described without further specification herein.

Having fully described my invention, what I claim as new, and desire to secure by Letters Patent, is—

1. The combination, in an electric-motor car, of the armature of the motor axially mounted and directly connected with the car-axle, with a hanger-frame pendulously suspended from the car-axle, the field-magnet frame independently supported upon the hanger-frame, and means for preventing the rotation of the latter with the car-axle, substantially as described.

2. The combination, in an electric-motor car, of the armature of the motor axially mounted and directly connected with the car-axle, with a hanger-frame pendulously suspended from the car-axle between the wheels thereon, the field-magnet frame independently supported upon the hanger-frame, and means for preventing the rotation of the latter with the car-axle, substantially as described.

3. The combination, in an electric-motor car, of the armature of the motor axially mounted and directly connected with the car-axle, with a hanger-frame pendulously suspended from the car-axle, the field-magnet frame elastically supported upon the hanger-frame, and means for preventing the rotation of the latter with the car-axle, substantially as described.

4. The combination, in an electric-motor car, of the armature of the motor axially mounted and directly connected with the car-axle, with a hanger-frame pendulously suspended from the car-axle, the field-magnet frame elastically supported upon the hanger-frame, and an independent connection of the hanger-frame with another part of the car for preventing the rotation of the hanger-frame with the car-axle, substantially as described.

5. The combination, in an electric-motor car, of the armature of the motor axially mounted and directly connected with the car-axle, with a hanger-frame pendulously suspended from the car-axle, the field-magnet frame independently supported upon the hanger-frame, and multipolar field-magnets symmetrically disposed about the armature, substantially as described.

6. The combination, in an electric-motor car, of the armature of the motor insulated from but axially mounted upon and directly connected with the car-axle, with a hanger-frame pendulously suspended from the car-axle, the field-magnet frame independently supported upon the hanger-frame, and means for preventing the rotation of the latter with the car-axle, substantially as described.

7. The combination, in an electric-motor car, of the armature of the motor insulated from but axially mounted upon and directly connected with the car-axle, with a hanger-frame pendulously suspended from the car-axle, the field-magnet frame elastically supported upon but insulated from the hanger-frame, and means for preventing the rotation of the latter with the car-axle, substantially as described.

8. The combination, in an electric-motor car, of the armature of the motor axially mounted and directly connected with the car-axle, with a hanger-frame pendulously suspended from the car-axle, the field-magnet frame elastically supported upon the hanger-frame, and means for preventing a movement of the field-magnet frame axially with reference to the armature, substantially as described.

9. The combination, in an electric-motor car, of the armature of the motor axially mounted and directly connected with the car-axle, with a hanger-frame pendulously suspended from the car-axle, the field-magnet frame independently supported upon the hanger-frame, and means for adjusting the field-magnets with reference to the armature, substantially as described.

In testimony whereof I have signed this specification in the presence of two subscribing witnesses.

S. H. SHORT.

Witnesses:
  A. B. CALHOUN,
  JOHN C. DOLPH.